United States Patent
Fujiwara

(10) Patent No.: US 8,427,719 B2
(45) Date of Patent: Apr. 23, 2013

(54) IMAGE READER

(75) Inventor: Takashi Fujiwara, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 381 days.

(21) Appl. No.: 12/821,353

(22) Filed: Jun. 23, 2010

(65) Prior Publication Data
US 2011/0075229 A1 Mar. 31, 2011

(30) Foreign Application Priority Data
Sep. 30, 2009 (JP) .................. 2009-227854

(51) Int. Cl.
*H04N 1/04* (2006.01)
(52) U.S. Cl.
USPC ............ 358/488; 358/513; 358/514; 358/497
(58) Field of Classification Search .................. 358/474, 358/496, 497, 486, 488, 513, 514, 461
See application file for complete search history.

(56) References Cited

U.S. PATENT DOCUMENTS

| | | | |
|---|---|---|---|
| 5,610,731 A | 3/1997 | Itoh | |
| 7,446,909 B2 * | 11/2008 | Hashizume | 358/474 |
| 7,558,437 B2 * | 7/2009 | Misaka | 382/275 |
| 7,580,161 B2 * | 8/2009 | Shoda | 358/461 |
| 7,583,415 B2 * | 9/2009 | Kimura | 358/461 |
| 7,688,477 B2 * | 3/2010 | Ikeno et al. | 358/449 |
| 7,791,772 B2 * | 9/2010 | Oguchi | 358/475 |
| 7,791,773 B2 * | 9/2010 | Akahane | 358/475 |
| 7,990,583 B2 * | 8/2011 | Sugeta | 358/475 |
| 8,089,664 B2 * | 1/2012 | Yokochi | 358/474 |
| 8,130,423 B2 * | 3/2012 | Nakano et al. | 358/474 |
| 8,154,779 B2 * | 4/2012 | Makino et al. | 358/520 |
| 8,159,731 B2 * | 4/2012 | Sato et al. | 358/497 |
| 8,253,986 B2 * | 8/2012 | Ikeno et al. | 358/461 |
| 8,253,988 B2 * | 8/2012 | Inukai | 358/474 |
| 8,259,370 B2 * | 9/2012 | Iwatsuka | 358/509 |
| 8,264,750 B2 * | 9/2012 | Takeuchi | 358/475 |

(Continued)

FOREIGN PATENT DOCUMENTS

| | | | |
|---|---|---|---|
| JP | 5276377 A | 10/1993 | |
| JP | 7288656 A | 10/1995 | |

(Continued)

OTHER PUBLICATIONS

Notification of Reasons for Rejection for Japanese patent application No. 2009-227854 mailed Jun. 28, 2011.

*Primary Examiner* — Negussie Worku
(74) *Attorney, Agent, or Firm* — Banner & Witcoff, Ltd.

(57) ABSTRACT

An image reader includes a loading unit including a first transparent member that has a loading surface on which a document sheet is placed, a reading unit that includes light receiving elements arranged in a first direction under the first transparent member and is configured to move in a second direction parallel to the loading surface and perpendicular to the first direction and to read an image from the document sheet placed on the loading surface by repeating an operation of scanning the document sheet in the first direction with the light receiving elements while moving in the second direction, and a black reference member including a black area that is disposed in a position lower than the loading surface of the first transparent member and higher than the light receiving elements and configured to be read in acquiring black reference data for black level correction.

4 Claims, 8 Drawing Sheets

U.S. PATENT DOCUMENTS

| | | | |
|---|---|---|---|
| 8,305,656 B2 * | 11/2012 | Hayashi et al. | 358/486 |
| 8,305,661 B2 * | 11/2012 | Baba | 358/505 |
| 8,310,736 B2 * | 11/2012 | Nakajima | 358/474 |
| 2006/0023267 A1 | 2/2006 | Ikeno et al. | |

FOREIGN PATENT DOCUMENTS

| | | |
|---|---|---|
| JP | 10186535 A | 7/1998 |
| JP | 10215349 A | 8/1998 |
| JP | 2005236834 A | 9/2005 |
| JP | 2006-065289 | 3/2006 |
| JP | 2006-270753 | 10/2006 |
| JP | 2009017021 A | 1/2009 |

* cited by examiner

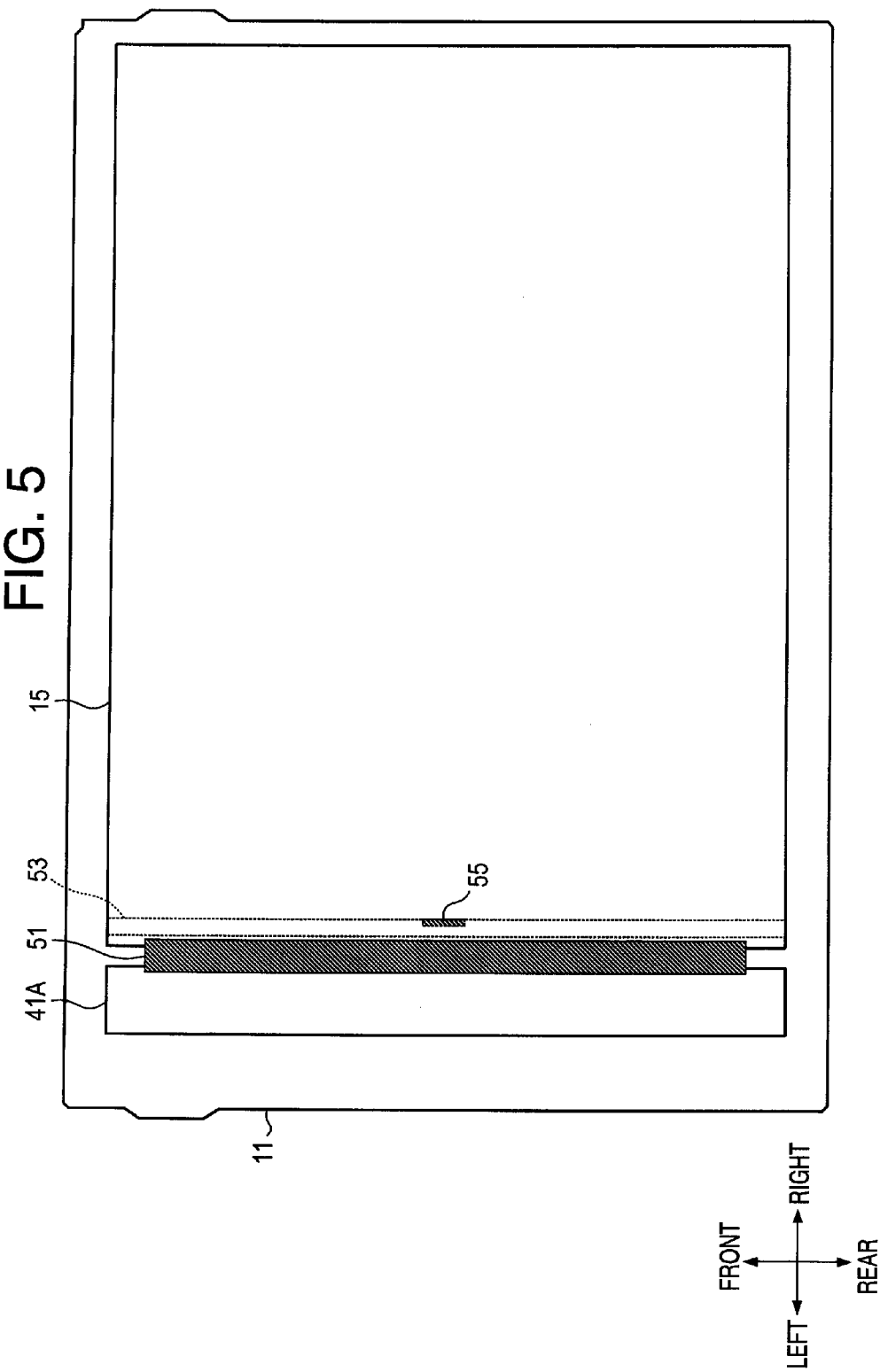

IMAGE READER

CROSS-REFERENCE TO RELATED APPLICATION

This application claims priority under 35 U.S.C. §119 from Japanese Patent Application No. 2009-227854 filed on Sep. 30, 2009. The entire subject matter of the application is incorporated herein by reference.

BACKGROUND

1. Technical Field

The following description relates to one or more image readers configured to read an image from an object to be read.

2. Related Art

An image reader having a one-dimensional image sensor has been known, which image reader performs reading operations for a black member and a white member prior to reading an image from an object to be read (i.e., a document sheet). Then, based on black reference data and white reference data acquired in the above reading operations, variation in read images, which is caused due to characteristic variations of light receiving elements and light emitters, is corrected.

In addition, such a black member and a white member are employed to specify an effective reading range in a main scanning direction (which corresponds to an array direction of a plurality of light receiving elements of the image sensor) and a reading start position in an auxiliary direction (which corresponds to a moving direction of the image sensor).

SUMMARY

In the image reader of the aforementioned type, the black member and the white member are generally disposed at an upper surface side of a glass plate on which an object to be read is placed, and configured to face, across the glass plate, the image sensor disposed under the glass plate.

However, when the black member is disposed in such a position, the (transparent) glass plate and a gap beneath the glass plate are present between the black member and the image sensor. Therefore, for instance, when outside light is incident, through the glass plate and the gap, onto the image sensor, it exerts such a negative influence such that black reference data cannot be obtained in an appropriate manner.

Aspects of the present invention are advantageous to provide one or more improved image readers that make it possible to prevent outside light from entering between a reading unit and a black member when acquiring black reference data, in a more efficient manner than ever.

According to aspects of the present invention, an image reader is provided, which includes a loading unit including a first transparent member, the first transparent member having a loading surface configured such that a document sheet is placed thereon, a reading unit including a plurality of light receiving elements arranged in a first direction under the first transparent member, the reading unit being configured to move in a second direction that is parallel to the loading surface and perpendicular to the first direction, the reading unit being further configured to read an image from the document sheet placed on the loading surface by repeating an operation of scanning the document sheet in the first direction with the light receiving elements while moving in the second direction, and a black reference member including a black area that is disposed in a position lower than the loading surface of the first transparent member and higher than the light receiving elements, the black area being configured to be read in acquiring black reference data for black level correction.

BRIEF DESCRIPTION OF THE ACCOMPANYING DRAWINGS

FIG. 5 schematically shows a positional relationship among the film, the black tape, a flatbed (FB) glass, and a first automatic document feeder (ADF) glass 41A when they are viewed from beneath them in the embodiment according to one or more aspects of the present invention.

Figure 6A:
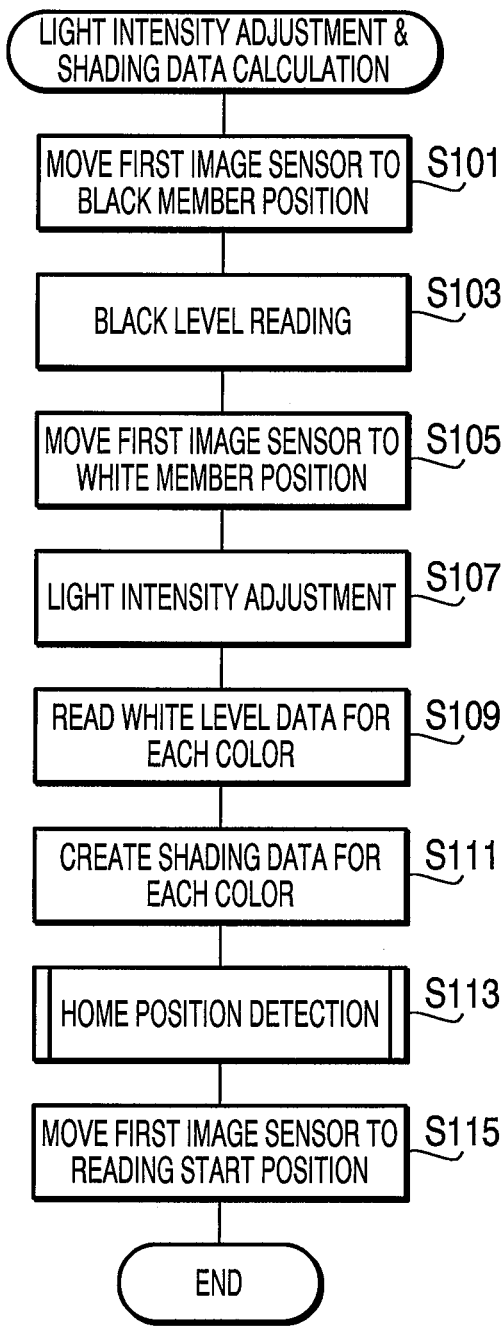

FIG. 6A is a flowchart showing a process for light intensity adjustment and shading data calculation that is executed by a controller of the MFP in the embodiment according to one or more aspects of the present invention.

Figure 6B:
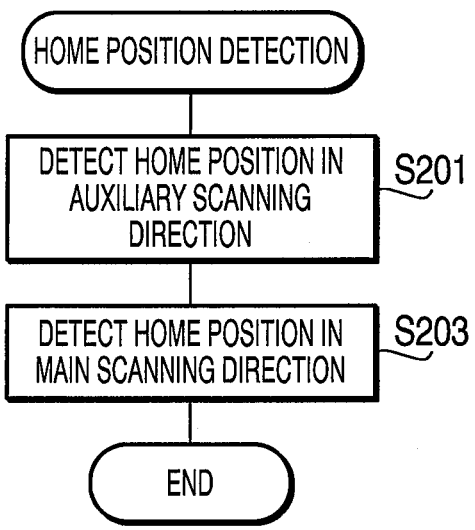

FIG. 6B is a flowchart showing a process for home position detection executed in the process for light intensity adjustment and shading data calculation in the embodiment according to one or more aspects of the present invention.

Figure 7A:
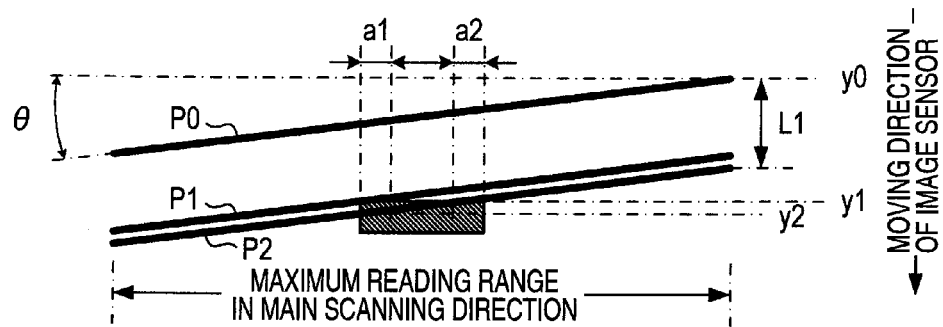

FIG. 7A shows a relationship between the location of the black tape and the timing when the black tape is detected in a state where the black tape is located around a center of a maximum reading range in a main scanning direction and a first image sensor is inclined at an angle θ relative to a reference position in the embodiment according to one or more aspects of the present invention.

Figure 7B:
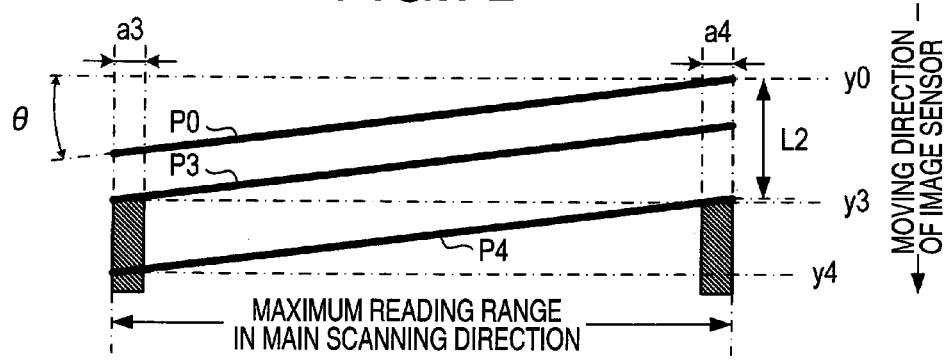

FIG. 7B shows a relationship between the location of the black tape and the timing when the black tape is detected in a state where the black tape is located around each end of the maximum reading range in the main scanning direction and the first image sensor is inclined at the angle θ relative to the reference position in a comparison example.

Figure 7C:
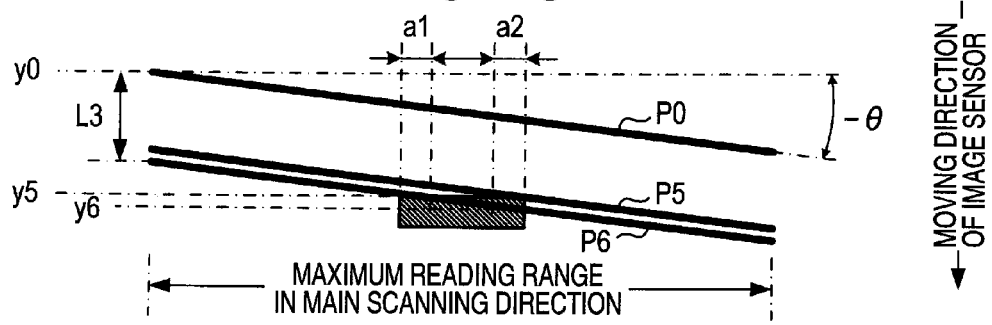

FIG. 7C shows a relationship between the location of the black tape and the timing when the black tape is detected in a state where the black tape is located around the center of the maximum reading range in the main scanning direction and the first image sensor is inclined at an angle −θ relative to the reference position in the embodiment according to one or more aspects of the present invention.

Figure 8A:
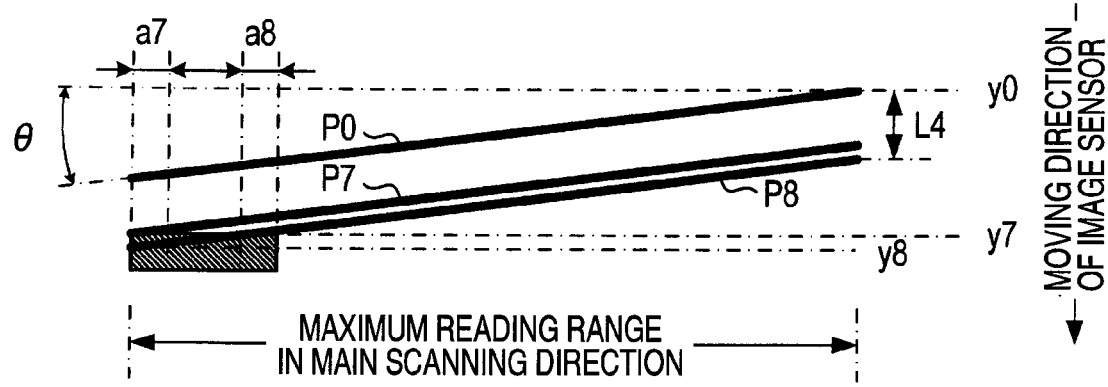

FIG. 8A shows a relationship between the location of the black tape and the timing when the black tape is detected in a state where the black tape is located around one end of the maximum reading range in the main scanning direction and the first image sensor is inclined at the angle θ relative to the reference position in a comparison example.

Figure 8B:
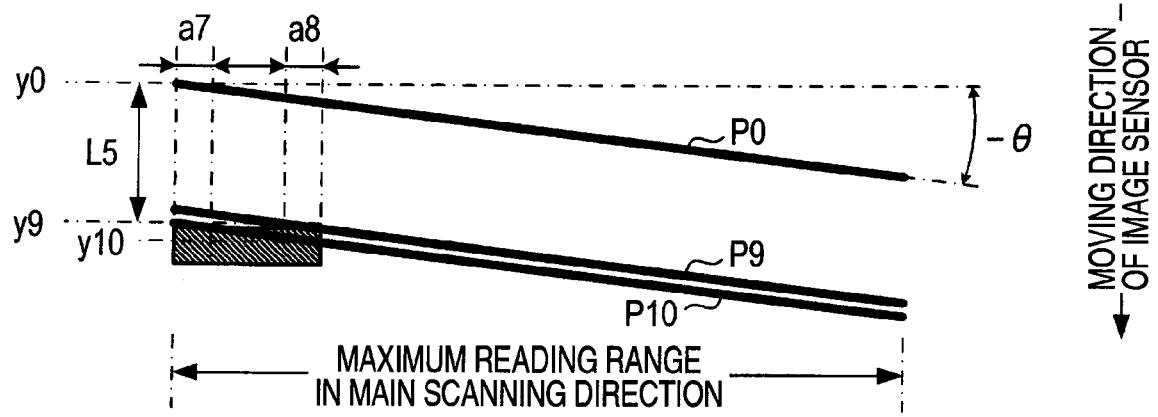

FIG. 8B shows a relationship between the location of the black tape and the timing when the black tape is detected in a state where the black tape is located around the one end of the maximum reading range in the main scanning direction and the first image sensor is inclined at the angle $-\theta$ relative to the reference position in a comparison example.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an embodiment according to aspects of the present invention will be described with reference to the accompany drawings.

[Configuration of MFP]

Figure 1A:
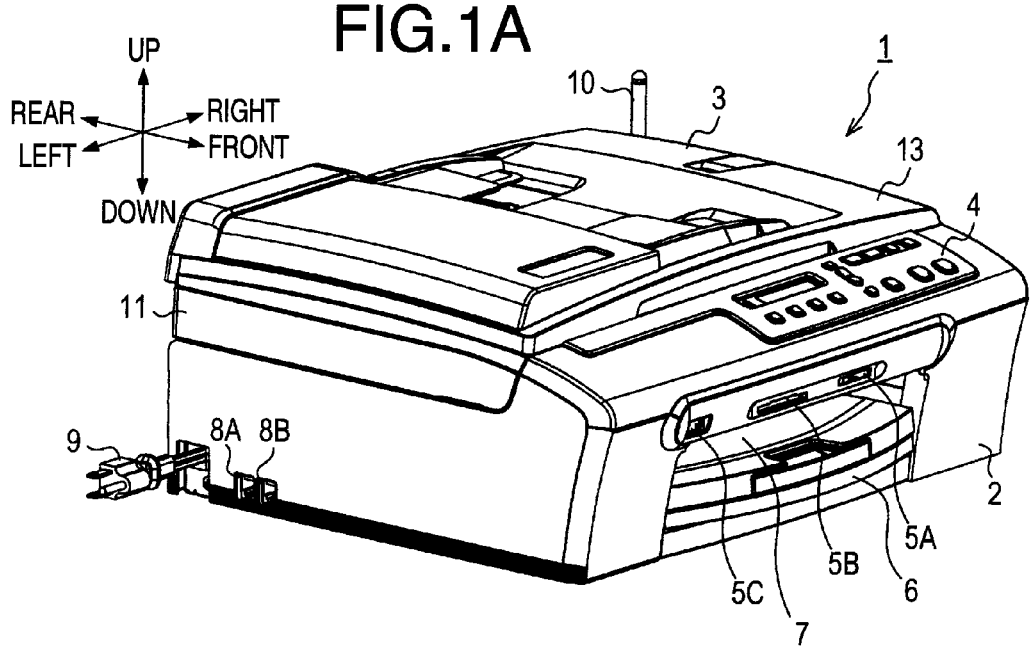
FIG. 1A is a perspective view showing an external configuration of a multi-function peripheral (MFP) with a flatbed cover thereof closed in an embodiment according to one or more aspects of the present invention.
Figure 1B:
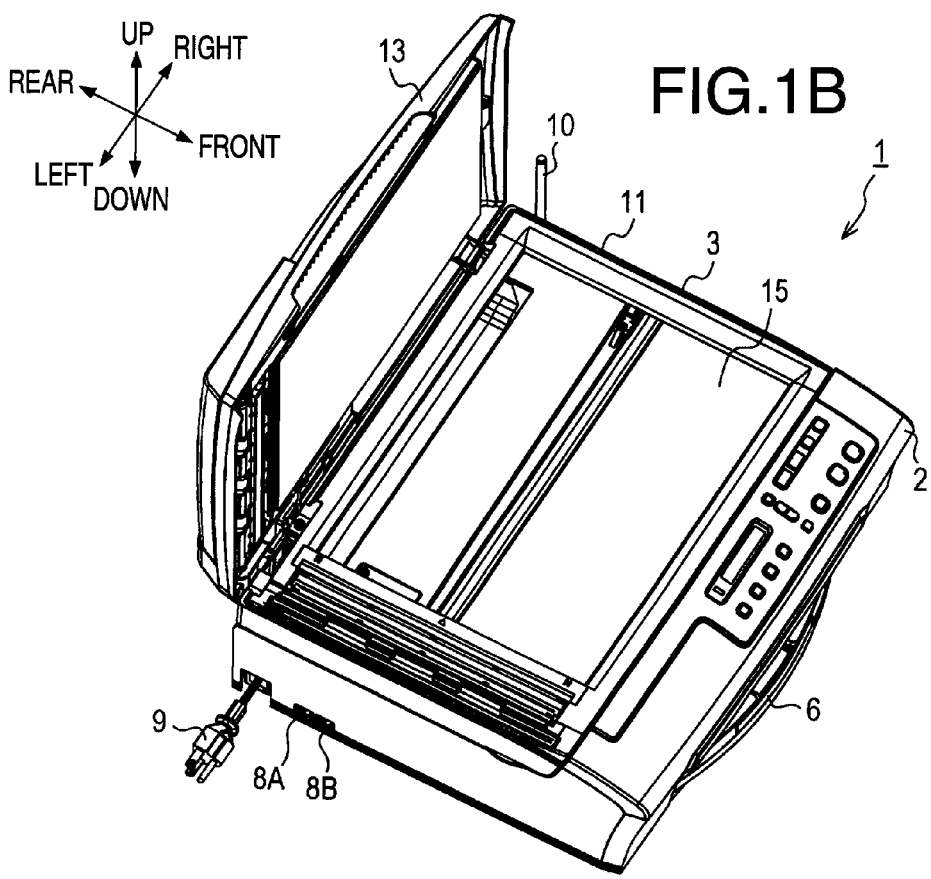
FIG. 1B is a perspective view showing an external configuration of the MFP with the flatbed cover thereof opened in an embodiment according to one or more aspects of the present invention.

A multi-function peripheral (MFP) 1 as shown in FIGS. 1A and 1B has a printer function, a copy function, a facsimile function, and a memory card reader-writer function, as well as a scanner function. In the following description, an up-to-down direction, a left-to-right direction, and a front-to-rear direction are defined as illustrated in the accompany drawings for the sake of simpler explanation. Nevertheless, it is noted that the MFP 1 may be installed to face a user in any of the left-to-right direction and the front-to-rear direction as defined.

The MFP 1 includes a main unit 2, and a scanning unit 3 disposed above the main unit 2. The scanning unit 3 is configured to be opened and closed relative to the main unit 2 when a front end of the scanning unit 3 is turned up and down around a rotational axis at a rear end of the scanning unit 3 (an open-close mechanism). Using the open-close mechanism, when moving the scanning unit 3 from a closed position as shown in FIG. 1A to an opened position (not shown), the user can implement maintenance for an internal mechanism incorporated in the main unit 2.

Further, the MFP 1 has an operation panel 4 disposed above the main unit 2, in front of the scanning unit 3. The operation panel 4 is provided with switches that are operated when the user issues commands to the MFP 1 and a liquid crystal display (LCD) unit for displaying information on the MFP 1.

At a front surface of the main unit 2, memory card slots 5A and 5B and a USB connector 5C are provided. The memory card slots 5A and 5B and the USB connector 5C are configured such that removable media, such as a memory card and a USB memory, are attached thereto. The removable media are used for storing thereon images read by the scanning unit 3 or printing image files stored on the removable media.

Further, a feed tray 6 is provided under the memory card slots 5A and 5B and the USB connector 5C, at a front side of the main unit 2. Above the feed tray 6, an ejection opening 7 is provided that is used for ejecting a printed sheet therethrough.

Further, the MFP 1 includes telephone line connectors 8A and 8B, and a power cord 9 that are provided at a left side surface of the main unit 2, and a wireless LAN communication antenna 10 provided on a right side surface of the main unit 2.

The scanning unit 3 includes a loading portion 11 on which an object to be read (i.e., a document sheet) is placed, and a cover 13 configured to cover an upper surface of the loading portion 11. At an upper side of the loading portion 11, a flatbed (FB) glass 15, which is formed with a transparent glass plate, is disposed. The FB glass 15 is configured such that a document sheet is placed thereon.

The cover 13 is configured to be opened and closed relative to the loading portion 11 when turned up and down around a rotational axis at a rear end of the cover 13. Further, separately from the mechanism configured to turn the cover 13 as above, the cover 13 is configured to be displaced relative to the loading portion 11 in the up-to-down direction. Thereby, even when a document sheet has a relatively large thickness, it is possible to sandwich the document sheet between the loading portion 11 and the cover 13.

[Control System of MFP]

Figure 2:
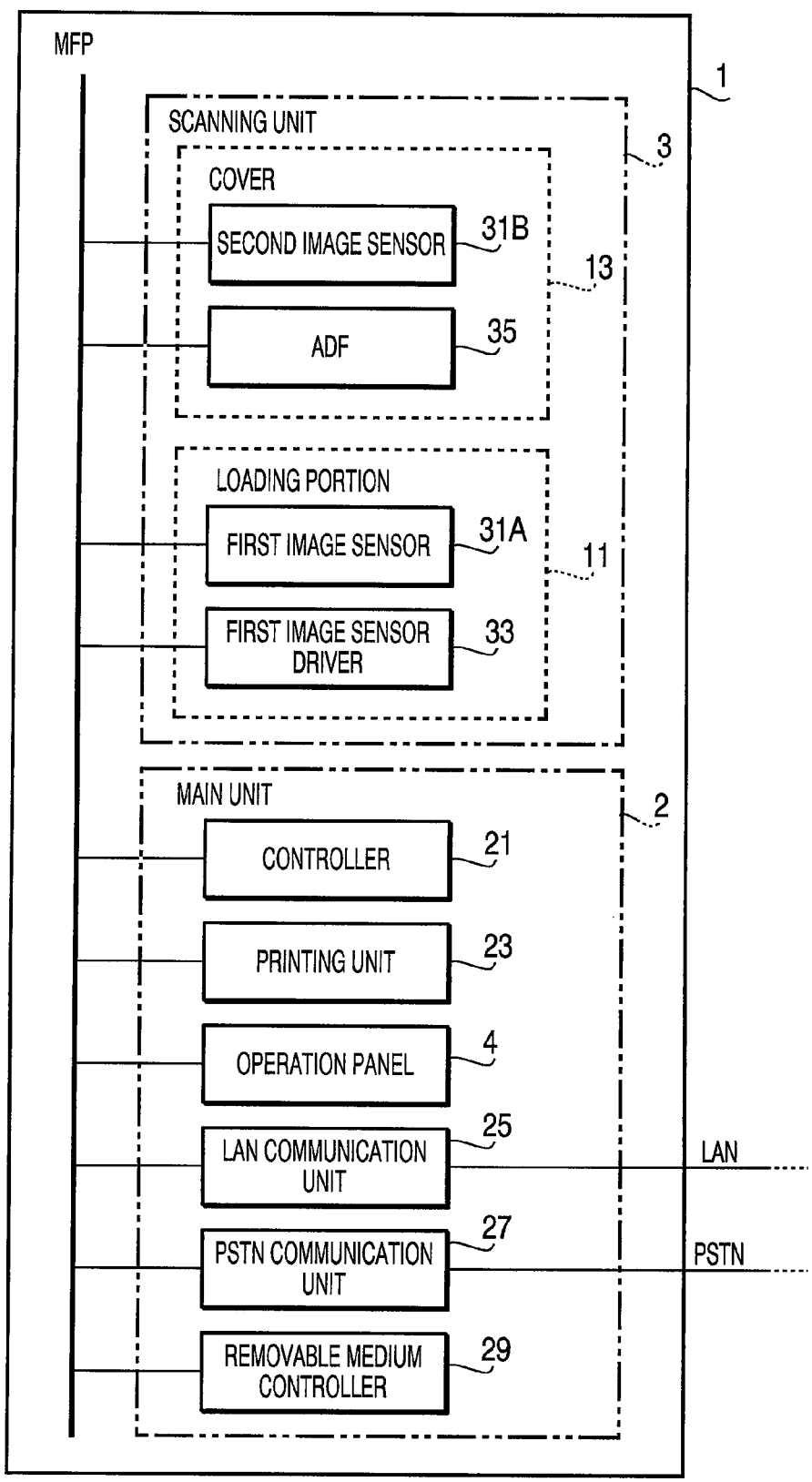
FIG. 2 is a block diagram schematically showing a control system of the MFP in the embodiment according to one or more aspects of the present invention.

Subsequently, an explanation will be provided about a control system of the MFP 1. As depicted in FIG. 2, the main unit 2 of the MFP 1 includes a controller 21, a printing unit 23, a LAN communication unit 25, a PSTN communication unit 27, and a removable medium controller 29, as well as the aforementioned operation panel 4.

In addition, in the scanning unit 3 of the MFP 1, a first image sensor 31A and a first image sensor driver 33 are incorporated at a side of the loading portion 11. Further, at a side of the cover 13 inside the scanning unit 3, a second image sensor 31B and an automatic document feeder (ADF) 35 are incorporated.

The controller 21 includes a known CPU, ROM, and RAM. By executing control programs stored on the ROM and the RAM, the CPU of the controller 21 takes control of elements included in the MFP 1.

The printing unit 23 is configured with an inkjet printing mechanism. When the copy function of the MFP 1 is utilized, the printing unit 23 is used to print an image read by the scanning unit 3. Further, when the facsimile function is utilized, the printing unit 23 is used to print an image received via facsimile communication.

The LAN communication unit 25 is configured with a communication interface device that supports a wireless LAN and a communication interface device that supports a wired LAN. The MFP 1 is configured to perform data communication with other devices communicable via a LAN, via the LAN communication unit 25.

The PSTN communication unit 27 is configured with various devices such as a FAX modem and a sound CODEC that are required for connection with public switched telephone networks (PSTN). The MFP 1 is configured to communicate with other device (e.g., a facsimile machine) communicable via the PSTN, via the PSTN communication unit 27. For example, when the facsimile function of the MFP 1 is utilized, data transmission is performed via the PSTN communication unit 27.

The removable medium controller 29 is configured to control data reading/writing operations to a removable medium, such as a memory card and a USB memory, which is attached to one of the memory card slots 5A and 5B and the USB connector 5C.

The first image sensor 31A and the second image sensor 31B are configured to optically read an image from a document sheet and generate electric signals corresponding to the read image. In the embodiment, a contact image sensor (CIS) is employed for each of the first image sensor 31A and the second image sensor 31B.

The first image sensor driver 33 is configured with a transmission mechanism (e.g., a timing belt) that transmits a driving force from a motor to the first image sensor 31A. The controller 21 controls the first image sensor driver 33 to move the first image sensor in an auxiliary scanning direction (i.e., the left-to-right direction).

The ADF 35 is configured to feed document sheets on a sheet-by-sheet basis.

[Details of Scanning Unit]

Figure 3:
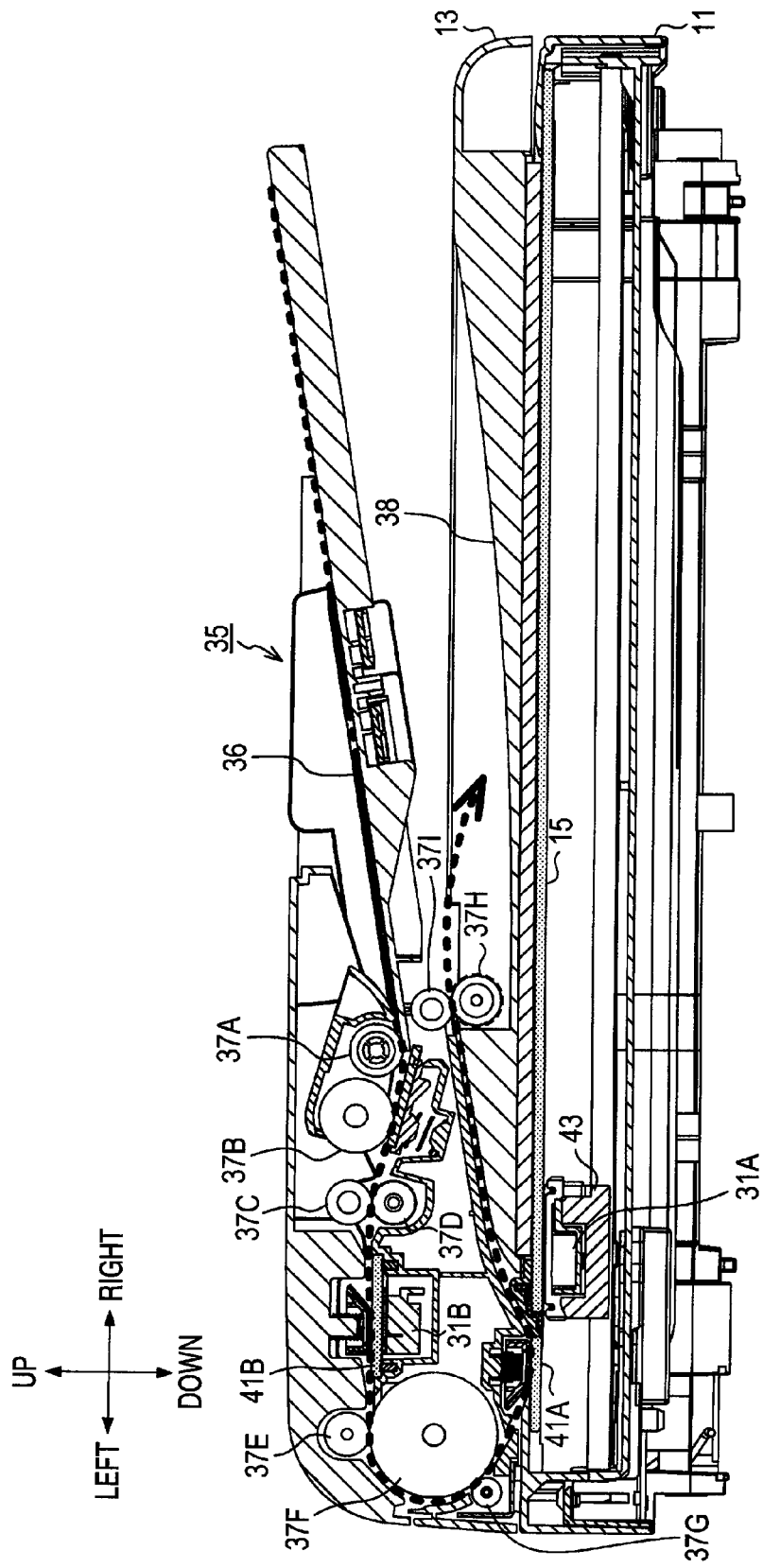
FIG. 3 is a cross-sectional side view showing an internal configuration of a scanning unit of the MFP in the embodiment according to one or more aspects of the present invention.

Next, a more detailed explanation will be provided about the scanning unit 3. As illustrated in FIG. 3, the ADF 35 provided to the scanning unit 3 is configured to feed a document sheet placed on a feed tray 36 with a plurality of feed rollers 37A to 37I and eject the document sheet onto a catch tray 38.

Then, the document sheet fed by the feed rollers 37A to 37I is conveyed on a feeding path indicated by a dashed line in FIG. 3. There are a first ADF glass 41A and a second ADF glass 41B respectively disposed in positions where the document sheet contacts the ADF glasses 41A and 41B while being conveyed.

The first ADF glass 41A is placed in such a position that a first surface and a second surface thereof are disposed in the same planes as a first surface and a second surface of the FB glass 15, respectively. Further, under the FB glass 15 and the first ADF glass 41A, a carriage 43 is placed that is driven by a driving force from a motor so as to reciprocate in the left-to-right direction.

The carriage 43 is mounted with the first image sensor 31A. Thereby, the first image sensor 31A can move to a position to face the first ADF glass 41A and a position to face the FB glass 15.

Meanwhile, the second ADF glass 41B is disposed upstream relative to the first ADF glass 41A (in a feeding direction) on the feeding path indicated by the dashed line in FIG. 3. The second image sensor 31B is fixed to a lower side of the second ADF glass 41B.

When the scanning unit 3 is utilized as an ADF type of image scanner, the first image sensor 31A is moved to and made static in the position to face the first ADF glass 41A.

Then, one of the both sides of a document sheet conveyed on the feeding path is read by the second image sensor 31B. Further, the other side is read by the first image sensor 31A that is disposed downstream relative to the second image sensor 31B on the feeding path. Thereby, it is possible to read images from the both sides of the document sheet.

The first image sensor 31A and the second image sensor 31B are disposed away from each other in the feeding direction. Therefore, in an image reading operation, the second image sensor 31B is controlled to start image reading earlier than the first image sensor 31A. Thereafter, at the moment when the document sheet reaches the position to face the first image sensor 31A, the first image sensor 31A is controlled to start reading an image from the document sheet.

It is noted that by operating the operation panel 4, the user can arbitrarily select one of double-side reading with both of the first image sensor 31A and the second image sensor 31B and single-side reading with one of the first image sensor 31A and the second image sensor 31B.

Meanwhile, when the scanning unit 3 is utilized as an FB type of image scanner, the first image sensor 31A is moved to the position to face the FB glass 15. Then, by scanning a document sheet placed on the FB glass 15 with the first image sensor 31A while moving the first image sensor 31A rightward from a reading start point along the FB glass 15, it is possible to read an image from the document sheet.

[Anti-jouncing Mechanism for First Image Sensor]

Figure 4:
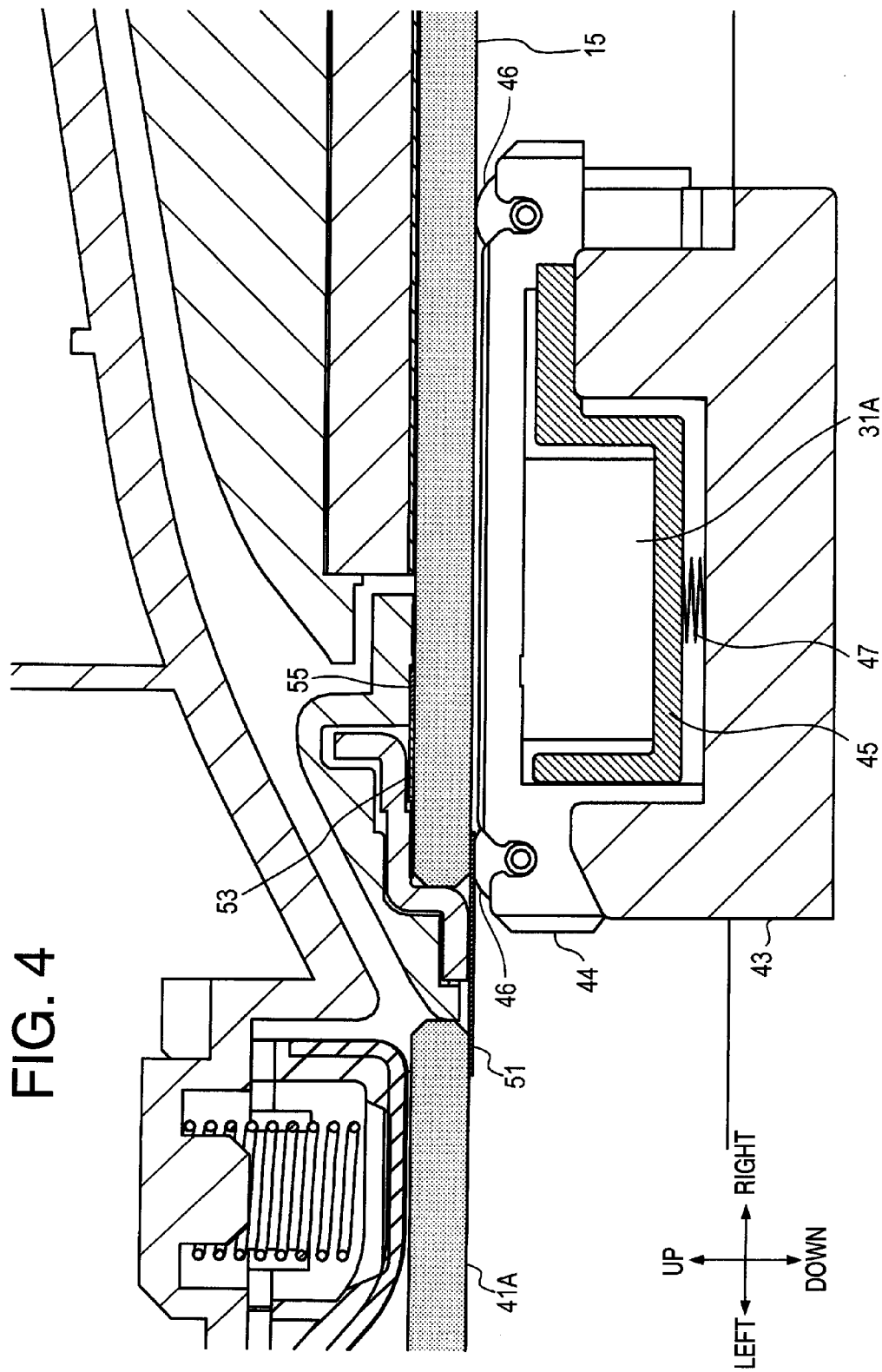
FIG. 4 is a cross-sectional side view showing, in an enlarged manner, a portion of the MFP that includes a film and a black tape in the embodiment according to one or more aspects of the present invention.

Subsequently, an explanation will be provided about an anti jouncing mechanism for the first image sensor 31A. In the scanning unit 3, as depicted in FIG. 4, the first image sensor 31A is fixed to a movable frame 45 that is configured to move up and down relative to the carriage 43. In addition, a compression spring 47 configured to push the movable frame 45 up is disposed between the movable frame 45 and the carriage 43. Thereby, the first image sensor 31A and the movable frame 45 are always pressed toward the FB glass 15.

Further, a roller holder 44 is disposed above the first image sensor 31A, and rollers 46 are attached to the roller holder 44. When the first image sensor 31A and the movable frame 45 are pushed up by the compression spring 47, the rollers come into contact with the FB glass 15. Thereby, the first image sensor 31 A is kept from contacting the FB glass 15.

The rollers 46 are rotatably supported by the roller holder 44. Hence, when the first image sensor 31A moves along the FB glass 15, the rollers 46 rotate in contact with the FB glass 15, and thus the first image sensor 31A moves while keeping a predetermined distance away from the FB glass 15.

In this regard, however, when the rollers 46 rotate in contact with the FB glass 15, and the first image sensor 31A moves from one to the other between the position to face the FB glass 15 and the position to face the first ADF glass 41A, the rollers 46 cannot help but pass over a gap area between the FB glass 15 and the first ADF glass 41A. Therefore, if the gap area has a great degree of surface roughness, when the rollers pass over the roughness, the movable frame 45 jounces.

In this regard, in the scanning unit 3, a plastic film 51 is disposed on the gap area between the FB glass 15 and the first ADF glass 41A. Therefore, when passing over the gap area between the FB glass 15 and the first ADF glass 41A, the rollers 46 rotate on the film 51. Thus, the rollers 46 can pass over the gap area without jouncing.

[Configuration for Acquiring Correction Data and Home Position of First Image Sensor]

Subsequently, an explanation will be provided about a configuration for acquiring correction data and a home position of the first image sensor 31A.

The aforementioned film 51 is formed from a black film. The film 51 serves as a black reference member which is read to acquire black reference data for black level correction. Thus, the film 51 is not only a member provided to make the rollers 46 smoothly pass over the gap area but also a member for acquiring the black reference data.

Further, as depicted in FIG. 5, a white tape 53 and a black tape 55 are attached onto an upper surface side of the FB glass 15. The white tape 53 is read by the first image sensor 31A in acquiring white reference data for white level correction. Additionally, the black tape 55 is read by the first image sensor 31A in determining a reference position for specifying a reading range in a main scanning direction and a reading start position in the auxiliary scanning direction for the first image sensor 31A.

The film 51 and the white tape 53 are read over an entire width in the main scanning direction (i.e., the front-to-rear direction) of the first image sensor 31A. Therefore, the film 51 and the white tape 53 have respective dimensions secured to extend over the entire width of the first image sensor 31A in the main scanning direction (see FIG. 4).

Meanwhile, the black tape 55 is disposed around a center of the first image sensor 31A in the main scanning direction, such that a boundary between the black tape 55 and the white tape 53 is utilized to determine a reference position for specifying the reading range and the reading start position of the first image sensor 31A.

[Details of Process Executed by Controller]

Next, an explanation will be provided about a process for light intensity adjustment and shading data calculation that is executed by the controller 21 of the MFP 1, with reference to FIGS. 6A and 6B. The process is performed when a command that instructs the first image sensor 1A to read an image is issued through the operation panel 4.

In the process, the controller 21 first controls the first image sensor driver 33 to move the first image sensor 31A to a black member position (S101). The black member position is a position where the first image sensor 31A faces the film 51.

Subsequently, the controller 21 controls the first image sensor 31A to perform black level reading (S103). Specifically, the controller 21 turns off light sources of the first image sensor 31A and, in that situation, controls the first image sensor 31A to perform a plurality of reading operations for the film 51. Then, the controller 21 determines an average value of data detected by each light receiving element of the first image sensor 31A in the plurality of reading operations (i.e., the average value is determined with respect to each light receiving element of the first image sensor 31A), and stores the average value as black reference data onto a memory of the controller 21.

Next, the controller 21 controls the first image sensor driver 33 to move the first image sensor 31A to a white member position (S105). The white member position is a position where the first image sensor 31A faces the white tape 53.

Then, the controller 21 performs light intensity adjustment (S107). Specifically, the controller 21 controls the first image sensor 31A to emit an adequately low intensity of light from the light sources of the first image sensor 31A to the white tape 53, and to read the light reflected by the white tape 53 with each light receiving element of the first image sensor 31A. At this time, when the intensity of the light emitted by the light sources is two low, it is impossible to acquire a predetermined level of output data from each light receiving element. Thus, the controller 21 controls the first image sensor 31A to increase the light intensity of the light sources until the output data from each light receiving element reaches the predetermined level. Then, when acquiring the predetermined level of output data from each light receiving element, the controller 21 stores the light intensity of the light sources at that moment onto the memory of the controller 21.

Subsequently, the controller 21 reads white level data for each color (S109). Specifically, the controller 21 performs the following operation with respect to each color (i.e., each of red (R), green (G), and blue (B)) of light source. First, the controller 21 controls each light source to illuminate the white tape 53 with light of the light intensity adjusted in S107, and in that situation, controls the first image sensor 31A to perform a plurality of reading operations for the white tape 53. Then, the controller 21 determines an average value of data detected by each light receiving element of the first image sensor 31A in the plurality of reading operations (i.e., the average value is determined with respect to each light receiving element of the first image sensor 31A), and stores the average value as black reference data onto the memory of the controller 21.

Thereafter, the controller 21 creates shading data of the black color using the black reference data acquired in S103, and creates shading data of the white color using the white reference data acquired in S109 (S111). Further, the controller 21 stores, onto the memory thereof, the shading data created for each color in S111. It is noted that the shading data created for each color is used for shading correction of image signals.

Subsequently, the controller 21 performs home position detection (S113). The home position detection will be described in detail with reference to FIG. 6B. In the home position detection, the controller 21 first detects a home position in the auxiliary scanning direction (S201). Specifically, the controller 21 controls the first image sensor driver 33 to move the first image sensor 31A in the auxiliary scanning direction, and controls the first image sensor 31A to perform a reading operation.

At this time, at an initial stage, the first image sensor 31A is set in a state to read the white tape 53 over the entire width of the first image sensor 31A in the main scanning direction. When moving further in the auxiliary scanning direction to continue the reading operation, the first image sensor 31A is changed into a state to read the black tape 55 around the center of the first image sensor 31A in the main scanning direction. Then, a position where the state change of the first image sensor 31A is caused is detected as a home position in the auxiliary scanning direction. It is noted that the home position in the auxiliary scanning direction is utilized as an origin for setting a displacement by which the first image sensor 31A is controlled to move in the auxiliary scanning direction.

Following S201, the controller 21 detects a home position in the main scanning direction (S203). Specifically, after changing the first image sensor 31A into the state to read the black tape 55 in S201, the controller 21 sets the first image sensor 31A into a state to read the black tape 55 in a more certain manner by moving the first image sensor 31A in the auxiliary scanning direction by a predetermined distance, and then, in that state, stops the movement of the first image sensor 31A in the auxiliary scanning direction.

In that state, the controller 21 controls the first image sensor 31A to read pixels in the main scanning direction, so as to detect edges at both sides of the black tape 55 in the main scanning direction. Then, the controller 21 specifies a median pixel between the edges as a central pixel in the main scanning direction. Further, the controller 21 specifies pixels that are located a predetermined number of pixels away from the central pixel toward the both ends in the main scanning direction, as pixels of both ends within the maximum reading range in the main scanning direction. Furthermore, the controller 21 detects one end of the maximum reading range in the main scanning direction, as a home position in the main scanning direction. It is noted that in the following operations, the home position in the main scanning direction is utilized as an origin for extracting an effective reading range from a range physically readable by the first image sensor 31A.

Thus, after determining the home positions in the main and auxiliary directions, the controller 21 moves the first image sensor 31A to the reading start position (S115). The reading start position is beneath the first ADF glass 41A when the ADF 35 is used. Further, the reading start position is near a left end of the FB glass 15, beneath the FB glass 15, when an image is read from a document sheet placed on the FB glass 15.

After the aforementioned process, a reading operation is performed by the first image sensor 31A. In this regard, nevertheless, since the reading operation is the same operation as executed by a general image scanner, an explanation about the reading operation will be omitted.

[Location of Black Tape]

Next, an explanation will be provided about influences that the location of the black tape 55 exerts on the detection of the home position in the auxiliary scanning direction in the aforementioned process.

In FIG. 7A, an angle $\theta$ corresponds to an inclination of the first image sensor 31A relative to an ideal attachment location thereof. The angle $\theta$ is actually a small angle within allowable tolerance. Nevertheless, in FIG. 7, for the sake of easy visual recognition, the angle $\theta$ is depicted in an exaggerated fashion.

When the first image sensor 31A starts the detection of the home position in the auxiliary scanning direction, a reading position of the first image sensor 31A changes from a position P0 to a position P2 via a position P1.

At this time, when the first image sensor 31A is inclined at the angle θ, the first image sensor 31A detects the black tape 55 in an area a1 in the main scanning direction at the moment when moving to the position P1. When it is determined that the first image sensor 31A detects the home position in the auxiliary scanning direction immediately at this moment, for instance, in the case where the first image sensor 31A mistakenly detects an undesired object different from the black tape 55, it is impossible to exactly specify the home position in the auxiliary scanning direction.

In consideration of the above problem, the MFP 1 determines that the detection of the home position in the auxiliary scanning direction is completely executed, with detection of the black tape 55 in each of the areas a1 and a2 in the main scanning direction. In this case, the first image sensor 31A has to move by a distance L1 until the detection of the home position in the auxiliary scanning direction is completely executed.

Meanwhile, it is assumed that a configuration as shown in FIG. 7B (a comparison example: there are black areas at both ends in the main scanning direction when the first image sensor 31A detects the home position in the auxiliary scanning direction) is adopted. In this case, the MFP 1 can determine that the detection of the home position in the auxiliary scanning direction is completely executed, with detection of the black tape 55 in each of areas a3 and a4 in the main scanning direction while the scanning position of the first image sensor 31A varies from the position PO to a position P4 via a position P3.

However, in this case, the first image sensor 31A has to move by a distance L2 until the detection of the home position in the auxiliary scanning direction is completely executed. The distance L2 is longer than the distance L1 as shown in FIG. 7A. Therefore, the MFP 1 of this comparison example requires a longer time to completely execute the detection of the home position in the auxiliary scanning direction than the MFP 1 of the embodiment. Further, a range, which has been read earlier than the position identified as the home position, is cut off without being treated as an effective range. Namely, the MFP 1 of the comparison example has a first problem that an area to be cut off is enlarged.

Further, in FIG. 7A, in order for the first image sensor 31A to detect the black tape 55 in each of the areas a1 and a2 in the main scanning direction while moving up to the position P2, the black tape 55 has to be present in each of the positions y1 and y2 in the auxiliary scanning direction.

Meanwhile, in FIG. 7B, in order for the first image sensor 31A to detect the black tape 55 in each of the areas a3 and a4 in the main scanning direction while moving up to the position P4, the black tape 55 has to be present in each of the positions y3 and y4 in the auxiliary scanning direction.

However, as the distance between the positions y3 and y4 is longer than the distance between the positions y1 and y2, it results in that the dimension of the black tape 55 in the auxiliary scanning direction in FIG. 7B has to be rendered larger than that in FIG. 7A. Accordingly, it leads to a second problem that the FB glass 15 has to be larger with its increased size in the auxiliary scanning direction such that the black tape 55 is disposed in a required manner as described above, and thus the MFP 1 is required to be larger.

In other words, depending on whether the black tape 55 is disposed around the center or each end of the maximum reading range of the first image sensor 31A in the main scanning direction, it is determined whether or not the aforementioned first and second problems are caused.

As illustrated in FIG. 7C, even though the first image sensor 31A is inclined at an angle −θ (which is different from the angle θ as depicted in FIG. 7A), the MFP 1 can determine that the detection of the home position in the auxiliary scanning direction is completely executed, with detection of the black tape 55 in each of the areas a1 and a2 in the main scanning direction while the scanning position of the first image sensor 31A varies from the position P0 to a position P6 via a position P5.

In this case, the first image sensor 31A has to move by a distance L3 until the detection of the home position in the auxiliary scanning direction is completely executed. Nevertheless, the distance L3 is the same as the distance L1 as shown in FIG. 7A. Further, the distance between the positions y5 and y6 is the same as the distance between the positions y1 and y2.

Namely, there is not a significant difference between times required for the detection of the home position in the auxiliary scanning direction in the cases shown in FIGS. 7A and 7B, respectively.

On the contrary, in comparison examples as shown in FIGS. 8A and 8B, the black tape 55 is disposed around not the center but an end of the maximum reading range of the first image sensor 31A in the main scanning direction. With respect to these comparison examples, there is a significant difference between distances L4 and L5. Here, the distance L4 is a distance by which the first image sensor 31A moves in the state inclined at the angle θ until the detection of the home position in the auxiliary scanning direction is completely executed. Further, the distance L5 is a distance by which the first image sensor 31A moves in the state inclined at the angle −θ until the detection of the home position in the auxiliary scanning direction is completely executed. Especially, the distance L5 is longer than the distance L1 as shown in FIG. 7A and the distance L3 as shown in FIG. 7C. It is noted that a distance between a position y7 and a position y8 is the same as a distance between a position y9 and a position y10.

Namely, in the comparison examples as shown in FIGS. 8A and 8B, the time required to complete the detection of the home position in the auxiliary scanning direction may vary depending on individual difference of the MFP 1, more considerably than the MFP 1 of the embodiment. Further, in a worse case, the time required to complete the detection of the home position in the auxiliary scanning direction becomes longer. Hence, it leads to a problem that an area to be cut off without being treated as an effective range is enlarged.

Thus, in the embodiment where the black tape 55 is located around the center of the maximum reading range in the main scanning direction as illustrated in FIGS. 7A and 7C, the time required to complete the detection of the home position in the auxiliary scanning direction can be shortened than the comparison examples where the black tape 55 is located around one end or each end of the maximum reading range in the main scanning direction. Further, the embodiment is more advantageous in downsizing the MFP 1 than the comparison example where the black tape 55 is located around each end of the maximum reading range in the main scanning direction as shown in FIG. 7B.

[Effects]

As described above, according to the scanning unit 3 of the MFP 1 in the embodiment, as a black reference member for acquiring the black reference data, the film 51 is disposed under a loading surface of the FB glass 15. Therefore, the first image sensor 31A can be placed closer to the black film 51 in comparison with a known configuration in which a black reference member is disposed on the loading surface. Hence, it is possible to prevent outside light from being incident into a gap between the first image sensor 31A and the film 51, and to acquire more appropriate black reference data.

Further, in the MFP 1, the film 51 is disposed such that the film 51 does not entirely overlap the FB glass 15. Therefore, compared with such a configuration that a black member entirely overlaps the FB glass 15, it is possible to reduce an area of the FB glass 15 that is unable to be utilized as the FB glass 15. Thus, it is possible to adequately enlarge an area of the film 51 that does not overlap the FB glass 15. Further, an area of the FB glass 15 that is unable to serve as the FB glass 15 is not enlarged along with the enlarged area of the film 51 that does not overlap the FB glass 15. Hence, it is possible to adopt, as the FB glass 15, a glass with an adequately small dimension in the auxiliary scanning direction. Thereby, it is possible to downsize the overall configuration of the scanning unit 3 or the MFP 1, in comparison with a known configuration thereof.

Further, in the MFP 1 of the embodiment, when the first image sensor 31A moves from one of the position to face the FB glass 15 and the position to face the first ADF glass 41A to the other, even though the rollers 46 passes over the gap area between the FB glass 15 and the first ADF glass 41A, it is possible to prevent the first image sensor 31A from jouncing, owing to the film 51. Additionally, the film 51, which serves as a member for preventing the first image sensor 31A from jouncing, is utilized as a black reference member. Therefore, compared with a configuration having a member for preventing the first image sensor 31A from jouncing and a black reference member separately provided, it is possible to reduce the number of parts contained in the MFP 1. Further, compared with a configuration having a member for preventing the first image sensor 31A from jouncing and a black reference member separately disposed, it is possible to reduce a space required for installing both the members, and thus to downsize the MFP 1.

Further, according to the MFP 1 of the embodiment, the black tape 55 is disposed around the center of the maximum reading range in the main scanning direction. Thereby, in comparison with a configuration having the black tape 55 disposed around one end or each end of the maximum reading range in the main scanning direction, it is possible to shorten the time required to complete the detection of the home position in the auxiliary scanning direction, and to efficiently downsize the MFP 1.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible.

In the aforementioned embodiment, a contact image sensor (CIS) is employed as the first image sensor 31A. However, according to aspects of the present invention, a CCD image sensor may be employed as the first image sensor 31A.

Further, in the aforementioned embodiment, aspects of the present invention are applied to the MFP 1. However, any function other than the scanner function may not be provided on an arbitrary basis. For instance, aspects of the present invention may be applied to an image reader having only a scanner function.

What is claimed is:

1. An image reader comprising:
   a first transparent member having a loading surface configured to receive placement of a document sheet thereon;
   a reading unit comprising a plurality of light receiving elements arranged in a first direction under the first transparent member, the reading unit being configured to move in a second direction parallel to the loading surface and perpendicular to the first direction, the reading unit being further configured to read an image from the document sheet placed on the loading surface by repeating an operation of scanning the document sheet in the first direction with the light receiving elements while moving in the second direction; and
   a black reference member comprising a black area that is disposed in a position between the first transparent member and the light receiving elements in a vertical direction, the black area being configured to be read in acquiring black reference data for black level correction.

2. The image reader according to claim 1, wherein the black area includes a portion configured to eliminate overlap with the first transparent member in a third direction perpendicular to the loading surface.

3. The image reader according to claim 1, further comprising:
   a document feeder configured to feed a document sheet;
   a second transparent member disposed between the reading unit and the document sheet fed by the document feeder to a position where the reading unit reads the document sheet; and
   a distance keeper configured to move together with the reading unit in the second direction, the distance keeper being configured to, when moving while facing the first transparent member, contact the first transparent member so as to keep an adequate distance between the reading unit and the first transparent member, the distance keeper being further configured to, when moving while facing the second transparent member, contact the second transparent member so as to keep an adequate distance between the reading unit and the second transparent member,
   wherein the black reference member is configured such that a first end in the second direction overlaps a lower surface of the first transparent member and a second end overlaps a lower surface of the second transparent member, and
   wherein the black reference member is configured to cover a gap area between the first transparent member and the second transparent member such that the distance keeper moves on the black reference member when passing over the gap area when moving between the first transparent member and the second transparent member.

4. The image reader according to claim 1, further comprising a position reference member configured to, when read by the reading unit, provide information on a reference position in the first direction and a reference position in the second direction,
  wherein the position reference member is disposed around a center of a maximum reading range of the reading unit in the first direction.

* * * * *